(12) United States Patent
Fischbach

(10) Patent No.: US 6,443,048 B1
(45) Date of Patent: Sep. 3, 2002

(54) PISTON FOR A CYLINDER AND A METHOD FOR ITS MANUFACTURE

(75) Inventor: Wolfgang Fischbach, Daaden (DE)

(73) Assignee: Heinrich Baumgarten KG Spezialfabrik fuer Beschlagteile, Neunkirchen (DE)

( * ) Notice: Subject to any disclaimer, the term of this patent is extended or adjusted under 35 U.S.C. 154(b) by 0 days.

(21) Appl. No.: 09/671,835

(22) Filed: Sep. 27, 2000

(30) Foreign Application Priority Data

Sep. 28, 1999 (DE) .......................................... 299 17 061

(51) Int. Cl.$^7$ .................................................. F16J 1/04
(52) U.S. Cl. ........................................... 92/222; 92/248
(58) Field of Search .................... 92/248, 222; 264/266, 264/267, 268, 328.1

(56) References Cited

U.S. PATENT DOCUMENTS 5,484,041 A * 1/1996 Cadaret et al. .......... 188/73.37
5,826,686 A * 10/1998 Rike ....................... 188/264 G

* cited by examiner

Primary Examiner—F. Daniel Lopez
Assistant Examiner—Michael Leslie
(74) Attorney, Agent, or Firm—Flynn, Thiel, Boutell & Tanis, P.C.

(57) ABSTRACT

The invention relates to a piston for a cylinder, in particular a brake piston for a brake cylinder, made of a plastic. Such a piston is improved so that the piston is not damaged by wear, and furthermore can be manufactured inexpensively within the prescribed tolerances. Furthermore contact of the hydraulic fluid with the plastic of the piston is prevented. This is achieved by the piston being provided with a container, made out of metal, which at least partially covers the outer surface of the piston and is adapted to be brought into contact with the cylinder wall.

8 Claims, 3 Drawing Sheets

PISTON FOR A CYLINDER AND A METHOD FOR ITS MANUFACTURE

FIELD OF THE INVENTION

The invention relates to a piston for a cylinder, in particular a brake piston for a brake cylinder, made of a plastic containing a filler and a method of manufacture thereof.

BACKGROUND OF THE INVENTION

Pistons made of plastic are known here and there from the state of the art. Such pistons, in particular brake pistons, often must be able to withstand high pressures and high temperatures during their use. In order to achieve a high strength and heat resistance, plastics are used for the pistons which contain up to 80% fillers. Such a filler can, for example, be rock flour. However, the disadvantage of such a plastic piston is that it can be torn by the cylinder. The piston can then no longer rest sealingly on the cylinder wall and the hydraulic fluid provided in the cylinder exits from the cylinder.

A further disadvantage of such a plastic piston is that it can be manufactured at best with a tolerance of 0.09 millimeter. However, in order for the piston-cylinder unit to function satisfactorily, a deviation of 0.015 millimeter at a maximum may exist. In order for a plastic piston to be able to be utilized, same thus needs to be machined so that the necessary diameter is obtained. A further disadvantage can be that unforeseen chemical-physical interactions can occur between the plastic of the piston and the hydraulic fluid, which interactions can influence the efficiency of the piston.

SUMMARY OF THE INVENTION

The basic purpose of the invention is thereby to provide a piston which cannot be damaged by the cylinder wall, which can be manufactured inexpensively within the prescribed tolerances, and in which a contact between the hydraulic fluid and the plastic is prevented. A further purpose relates to the accurately fitting manufacture of the piston.

This purpose is attained according to the invention by the piston being provided with a container made out of metal, by the outer surface of the piston being at least partially covered and being brought into contact with the cylinder wall.

The piston of the invention provided with a container meets the two requirements demanded in the purpose of the invention. The container prevents, on the one hand, a direct contact between the plastic of the piston and the cylinder wall so that the piston is not damaged and, on the other hand, the container can be manufactured with such preciseness in the dimensions thereof that the piston equipped therewith meets the demanded tolerances. Furthermore a contact between the plastic of the piston and the hydraulic fluid is prevented, thus eliminating a physical-chemical interaction between the plastic and the hydraulic fluid.

The container can thereby be glued according to the invention to the outer surface of the piston. Grooves extending in direction of the piston axis are then advantageously provided in the outer surface of the piston, which grooves can receive an adhesive. As an alternative it is also possible for the container to be connected to the piston through a mere frictional and/or form lock achieved by a press fit relation therebetween.

The piston has in an advantageous embodiment a hole extending in direction of the piston axis. The hole can then have according to the invention one or several undercuts. The braking shoes of a braking system can then, for example, be secured to these undercuts. The undercuts can moreover according to the invention extend to the bottom of the hole.

However, the hole in the piston can according to the invention also be a through-hole. The through-hole can then be closed off with an insertable bottom member.

The bottom of the hole can according to the invention have one or several recesses. This saves weight, in case the recesses forming the holes are already formed during an injection molding process, and also material.

The bottom of the container can advantageously rest on the bottom of the hole.

The purpose relating to the manufacture of a piston of the invention is attained by initially forming a container-shaped semi-finished product, the outside dimensions of which are equal to or slightly less than the outside dimensions of the piston to be manufactured, by subsequently inserting the semi-finished product into a tool which has the outer contour of the piston to be manufactured, by thereafter filling plastic under high pressure and, if necessary, high temperature into the container-shaped semi-finished product, thus causing an expansion of the semi-finished product to the outside dimensions prescribed by the tool, and by finally removing the container filled with the solidified plastic from the tool.

The container-shaped semi-finished product, which in its outside dimensions is slightly smaller than the finished piston, is inserted into a tool. This tool, advantageously an injection-molding tool, has exactly the dimensions which the piston to be manufactured is supposed to have. The semi-finished product is filled under high pressure with plastic, which causes the walls of the semi-finished product to be pressed outwardly until they rest against the tool. The container receives thus exactly the desired outer contour, while the plastic of the piston is fed clearance-free into the container. Also a subsequent fastening of the plastic in the container becomes unnecessary. A quick and economical manufacture of the piston is possible with this method, thus eliminating a finish-working because of the precise manufacture.

The container has advantageously a corrosion protection property or consists of a fine steel.

BRIEF DESCRIPTION OF THE DRAWINGS

Various exemplary embodiments of the piston of the invention are described in connection with the drawings, in which.

DETAILED DESCRIPTION

Figure 1:
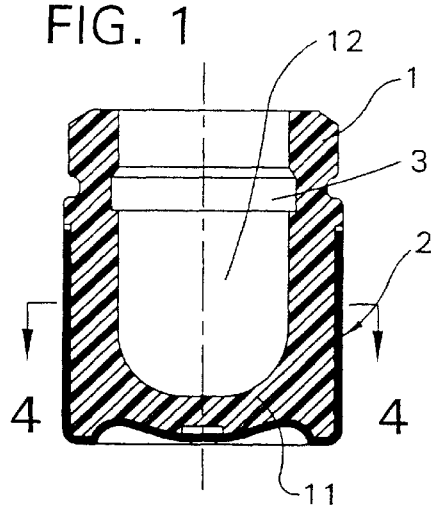
FIG. 1 illustrates a piston of the invention with the container glued thereto.
Figure 2:
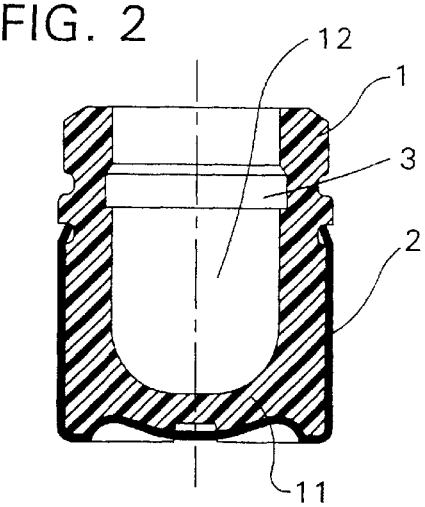
FIG. 2 illustrates a piston of the invention with a frictionally and form-lockingly or mechanically attached container.
Figure 3:
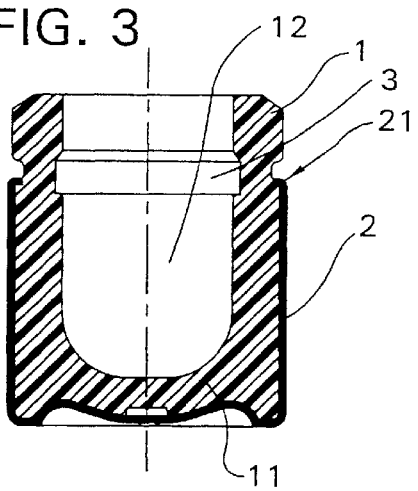
FIG. 3 illustrates a further piston of the invention with a frictionally and form-lockingly or mechanically attached container.

The pistons 1 of the invention illustrated in FIGS. 1 to 3 have a central hole or recess 12 extending in direction of the piston axis. An undercut 3 is provided in the wall of the hole 12. The undercut 3 is designed as an annular groove. A container 2 is placed from outside over the piston 1, which container is closed off with a bottom wall 23. The bottom wall 23 of the container rests thereby on or against the bottom portion 11 of the hole 12.

Figure 4:
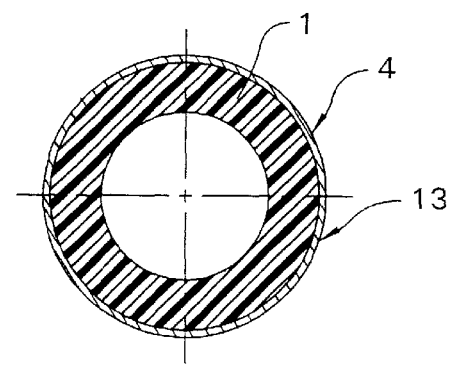
FIG. 4 is a horizontal cross section of the piston of the invention according to FIG. 1.

The exemplary embodiment according to FIG. 1 differs from the exemplary embodiments of FIGS. 2 and 3 in that here the container is glued to the outside of the outer surface 13 of the piston. The outer surface 13 has for this purpose grooves 13A extending in direction of the piston axis, which grooves can absorb excess glue 4 (FIG. 4). Whereas the exemplary embodiments according to FIGS. 2 and 3 have a container 2 which is attached frictionally and form-lockingly or mechanically to the piston 1. The form lock or crimped mechanical lock is thereby formed on the joining edge 21 of the container 2.

Figure 5:
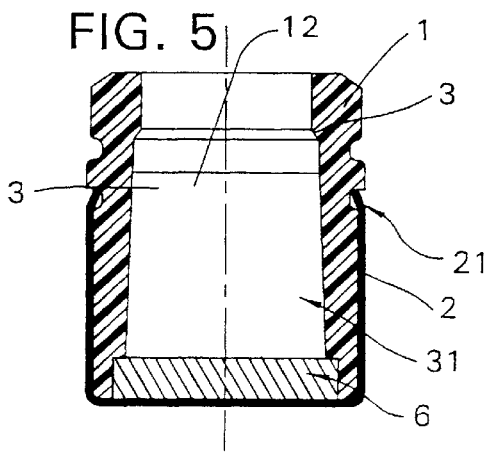
FIG. 5 illustrates a piston of the invention with an insertable bottom member.

The exemplary embodiment according to FIG. 5 has a central through-hole 12. The through-hole 12 is thereby closed off by a bottom member 6 which is inserted into the through-hole 12. The through-hole 12 has also an undercut 3 which extends axially to the bottom member 6. The container 2 is connected to the piston 1 through friction and form or mechanical lock as at 21. The exemplary embodiment according to FIG. 6 differs also through the design of the piston from the preceding one. The bottom wall of the hole 12 has several through-holes 5 with axially extending side wall recesses in the undercuts 3, 31 and in direction of the opening of the hole 12. The container 2 is otherwise, just like in the previous exemplary embodiment, attached to the piston 1 by means of friction and form or mechanical lock as at 21.

Figure 6:
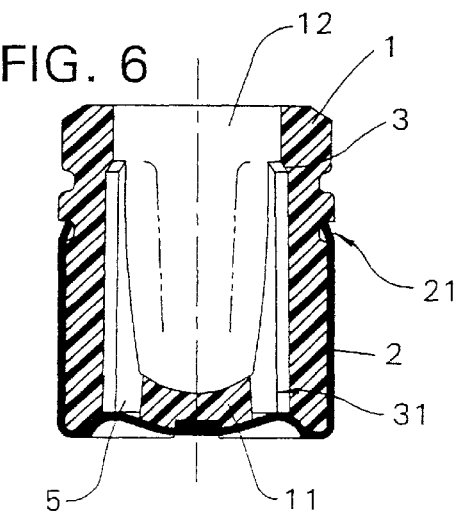
FIG. 6 illustrates a piston of the invention with recesses in the bottom of the hole.
Figure 7A:
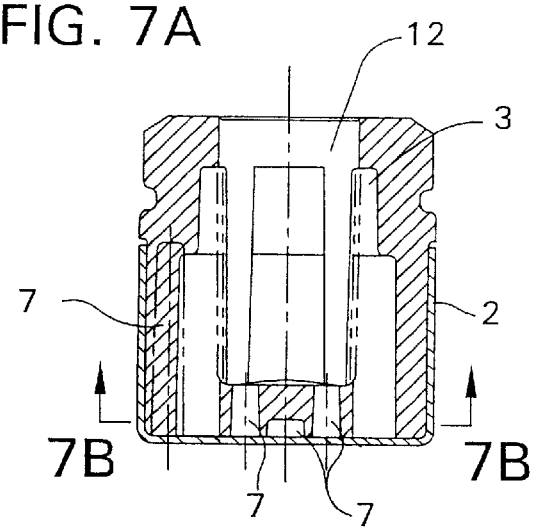
FIGS. 7A and 7B illustrate a piston of the invention with holes to save material and weight.
Figure 7B:
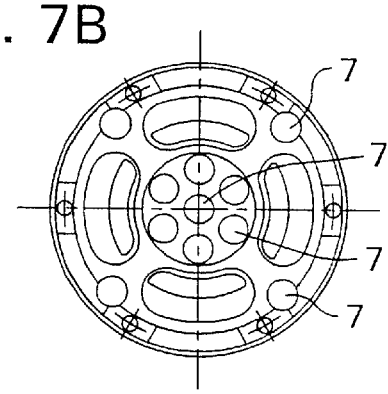

The piston 1 illustrated in FIGS. 7A and 7B differs from the piston according to FIG. 6 by holes 7 randomly provided in the bottom wall of the piston 1. These holes 7 are used to save weight and material. The piston 1 is in this manner reduced to the necessary support skeleton which holds the container 2.

Figure 8:
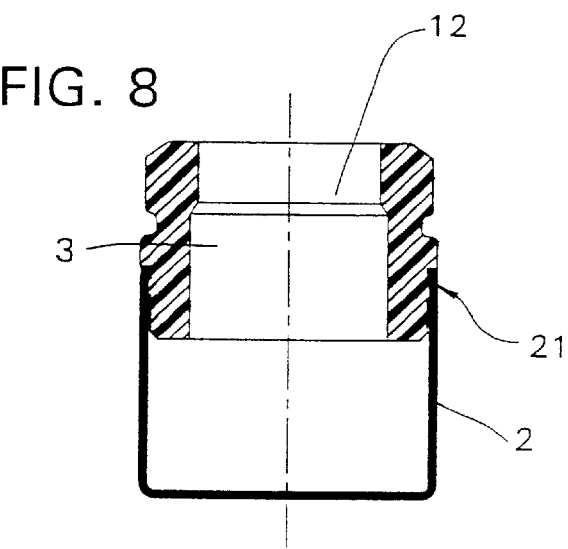
FIG. 8 illustrates a further piston of the invention.

FIG. 8 illustrates a piston, which, in comparison to the so far described pistons, is of a short construction. The container 2 is then placed onto this piston 1, which container closes off the piston 1. The container sits thereby on a shoulder formed into the piston, however, it is not completely filled out by the piston. The bottom wall of the container thus does also not rest against the piston. With this type of construction it can be achieved that substantially less plastic is used for the manufacture of the piston. This means a savings in material, which in the case of a mass-produced article (as for example a brake piston) is of a significant economical advantage.

Figure 9:
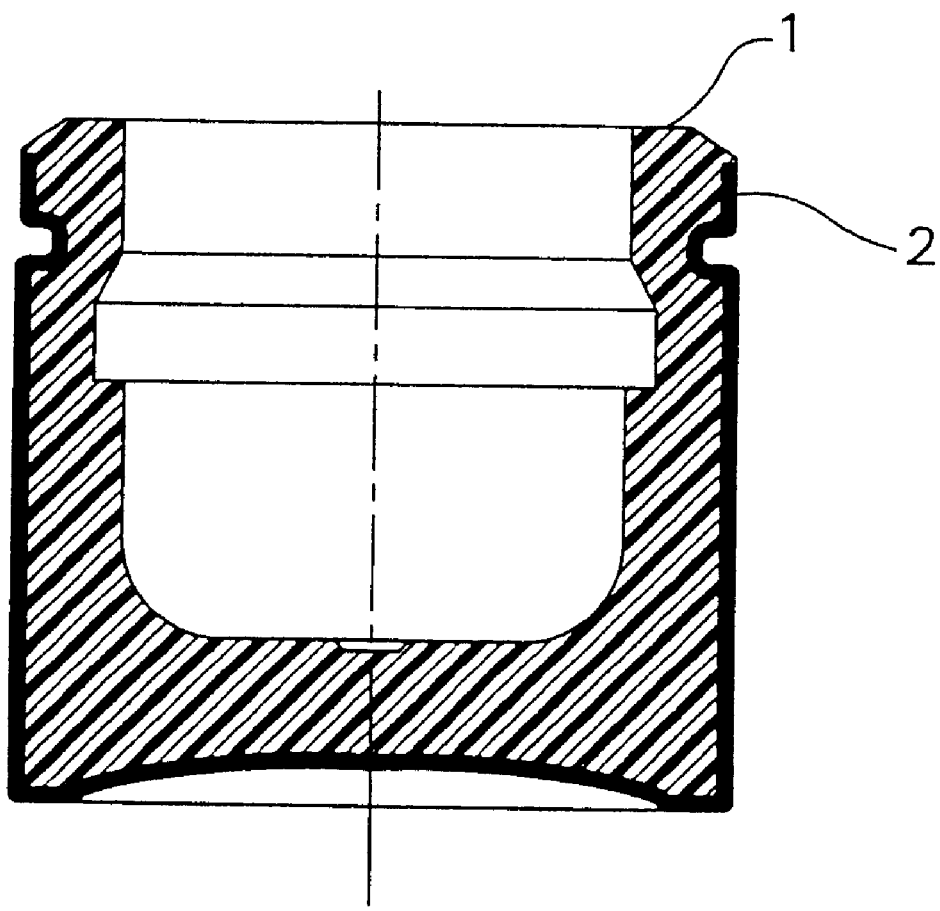
FIG. 9 illustrates an exemplary embodiment which is manufactured according to the method of the invention.

The piston 1 illustrated in FIG. 9 is manufactured in such a manner that initially a container-shaped semi-finished product is deep-drawn out of sheet metal, which semi-finished product has outside dimensions which are slightly less than the outside dimensions of the finished piston 1. The semi-finished product is inserted into a tool which has the outside contour of a finished piston. A plastic is then injected under high pressure and increased temperature into this container-shaped semi-finished product. The semi-finished product is expanded by the high pressure at which the plastic is injected into the semi-finished product, so that it in the end rests against the tool and has the contour of the finished piston. The outside contour of the container-shaped semi-finished product is stabilized by the solidified plastic. A groove can be provided in the outer contour 13, which groove on the one hand serves a form-locking connection between container 2 and piston 1 and on the other hand, is utilized as a fastening groove for attachments. The semi-finished product has a coating on its outside, which coating prevents corrosion. The inside of the semi-finished product is roughened so that the injected plastic adheres to same and an intimate connection between container 2 and piston 1 is achieved.

What is claimed is:

1. In a piston for a cylinder, composed of plastic, the improvement comprising a container composed of metal, which at least partially covers the outer surface of the piston and is in contact with the cylinder wall, wherein an outer surface of the piston has grooves extending in direction of the piston axis.

2. In a piston for a cylinder, composed of plastic, the improvement comprising a container composed of metal, which at least partially covers the outer surface of the piston and is in contact with the cylinder wall, wherein the piston has a hole extending in a direction of a piston axis wherein a wall of the hole has at least one undercut, the at least one undercut extending to a bottom wall of the hole.

3. The piston according to claim 2, wherein the bottom wall of the hole has at least one recess.

4. The piston according to claim 2, wherein a bottom wall of the container rests against the bottom wall of the hole.

5. In a piston for a cylinder, composed of plastic, the improvement comprising a container composed of metal, which at least partially covers the outer surface of the piston and is in contact with the cylinder wall, wherein the piston has a hole extending in a direction of a piston axis, and further wherein the hole is a through-hole and said through-hole is closed off with an insertable bottom member.

6. In a method for the manufacture of a piston for a cylinder, made out of plastic, the improvement comprising initially forming a semi-finished container out of metal so the outside dimensions of the container are essentially equal to or slightly less than the outside dimensions of the piston to be manufactured, inserting the semi-finished container into a tool having the outer contour of the piston to be manufactured, filling the semi-finished container with plastic of at least one of a high pressure and a high temperature, which causes the semi-finished container to be expanded into a finished container and to receive the outside dimensions prescribed by the tool, and removing the finished container filled with the solidified plastic from the tool.

7. The method according to claim 6, including a step of hardening the plastic injected into the semi-finished container in the tool under pressure.

8. The method according to claim 6, including a step of surface-treating a surface of the semi-finished container that contacts the plastic in such a manner that the plastic adheres to said surface.

\* \* \* \* \*